US009913214B2

(12) United States Patent
Xhafa et al.

(10) Patent No.: US 9,913,214 B2
(45) **Date of Patent: *Mar. 6, 2018**

(54) NETWORK POWER OPTIMIZATION VIA WHITE LISTS

(71) Applicant: Texas Instruments Incorporated, Dallas, TX (US)

(72) Inventors: Ariton E. Xhafa, Plano, TX (US); Xiaolin Lu, Plano, TX (US); Jianwei Zhou, Dallas, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 14/862,787

(22) Filed: Sep. 23, 2015

(65) Prior Publication Data

US 2016/0014690 A1 Jan. 14, 2016

Related U.S. Application Data

(63) Continuation of application No. 14/280,232, filed on May 16, 2014, now Pat. No. 9,172,517.

(Continued)

(51) Int. Cl.

*G08C 17/00* (2006.01)
*H04W 52/02* (2009.01)

(Continued)

(52) U.S. Cl.

CPC ........... *H04W 52/02* (2013.01); *H04L 5/0053* (2013.01); *H04L 67/12* (2013.01); *H04W 52/0219* (2013.01); *Y02B 60/50* (2013.01)

(58) Field of Classification Search

CPC . H04W 52/00; H04W 52/02; H04W 52/0203; H04W 52/0212; H04W 52/0219;

(Continued)

(56) References Cited

U.S. PATENT DOCUMENTS 7,979,096 B1 * 7/2011 Elliott ............... H04W 72/1278 340/539.22
8,194,571 B2 * 6/2012 Herrmann ............... H04L 12/12 370/254

(Continued)

OTHER PUBLICATIONS

Kannan, Perumal, et al., "Neighbor Based TDMA Slot Assignment Algorithm for WSN", Internet Citation, Mar. 2005, XP007901373, Retrieved from the Internet: URL:http://dawn.cs.umbc.edu/INFOCOM2005/patro-abs.pdf (retrieved on Nov. 24, 2006), whole document.

*Primary Examiner* — Kevin Mew
(74) *Attorney, Agent, or Firm* — Rose Alyssa Keagy; Charles A. Brill; Frank D. Cimino

(57) ABSTRACT

The white list generator identifies wireless sensor nodes that communicate via a wireless sensor network, to identifies time slots assigned for with each of the identified wireless sensor nodes, and to create and maintain a list of the identified wireless sensor nodes and corresponding time slots. The white list generator provides power control information to power a transceiver for reception of transmissions from each identified wireless sensor node based on the identified time slots corresponding to the identified wireless sensor node provided in the list.

12 Claims, 2 Drawing Sheets

Related U.S. Application Data

(60) Provisional application No. 61/830,974, filed on Jun. 4, 2013.

(51) Int. Cl.
*H04L 5/00* (2006.01)
*H04L 29/08* (2006.01)

(58) Field of Classification Search
CPC .......... H04W 52/0229; H04W 52/0235; H04L 5/0053; H04L 67/12; Y02B 60/40; Y02B 60/43; Y02B 60/50
See application file for complete search history.

(56) References Cited

U.S. PATENT DOCUMENTS 8,340,053 B2 * 12/2012 Kim ...................... H04W 74/04 370/336
8,423,657 B2 4/2013 Jun et al.
8,943,352 B1 * 1/2015 Warneke ............... G06F 1/3234 327/113
2003/0151513 A1 * 8/2003 Herrmann ............ G08B 25/003 340/573.1
2003/0152041 A1 * 8/2003 Herrmann ............... H04L 12/12 370/310
2005/0122231 A1 * 6/2005 Varaiya ................. H04W 40/22 340/870.01
2006/0114940 A1 * 6/2006 Cho ....................... G01D 21/00 370/498
2006/0248197 A1 * 11/2006 Evans ..................... H04L 47/14 709/227
2007/0019594 A1 1/2007 Perumal et al.
2007/0058634 A1 * 3/2007 Gupta ..................... H04L 67/12 370/392
2007/0286102 A1 * 12/2007 Shimokawa .......... H04W 74/08 370/310
2008/0232344 A1 * 9/2008 Basu ...................... G01D 9/005 370/350
2008/0253327 A1 * 10/2008 Kohvakka ............. H04W 16/14 370/330
2008/0267159 A1 10/2008 Mattsson et al.
2009/0016314 A1 * 1/2009 Kim .................. H04W 72/1257 370/345
2009/0097439 A1 * 4/2009 Lee ..................... H04W 56/009 370/328
2009/0147714 A1 * 6/2009 Jain ................... H04W 52/0216 370/311
2009/0154407 A1 * 6/2009 Jeong .................... H04W 40/32 370/329
2009/0154481 A1 6/2009 Han et al.
2009/0207769 A1 * 8/2009 Park ...................... H04W 74/04 370/311
2009/0232038 A1 * 9/2009 Gonzalez-Velazquez H04B 7/2656 370/311
2010/0097988 A1 * 4/2010 Chung ............. H04W 56/0015 370/328
2010/0115130 A1 * 5/2010 Jun ......................... H04L 12/12 709/242
2010/0195560 A1 * 8/2010 Nozaki ................ H04B 7/2606 370/315
2010/0278087 A1 * 11/2010 Kawakami ........ H04W 52/0216 370/311
2011/0002251 A1 * 1/2011 Shin ...................... H04J 3/0679 370/311
2011/0085442 A1 * 4/2011 Lin ......................... H04L 45/42 370/235
2011/0158204 A1 * 6/2011 Shin .................. H04W 52/0216 370/336
2012/0243465 A1 * 9/2012 Wohlford ............ H04W 76/025 370/316
2013/0070671 A1 * 3/2013 Ezure ...................... H04L 45/48 370/328
2013/0076531 A1 * 3/2013 San Vicente ......... A61B 5/0015 340/870.02
2013/0107750 A1 * 5/2013 Tiberi ................... G06F 1/3209 370/252
2013/0197859 A1 * 8/2013 Albano .............. G06K 9/00369 702/150
2013/0329658 A1 * 12/2013 Liu ....................... H04W 74/02 370/329

* cited by examiner

NETWORK POWER OPTIMIZATION VIA WHITE LISTS

CROSS-REFERENCE TO RELATED APPLICATION

This application is a Continuation of and claims priority to U.S. patent application Ser. No. 14/280,232, filed May 16, 2014, which claims priority to U.S. Provisional Patent Application No. 61/830,974, filed on Jun. 4, 2013. Said applications are hereby incorporated herein by reference in their entireties.

BACKGROUND

Wireless Sensor Networks (WSNs) are used in various application areas, including industrial process monitoring and control, environment and habitat monitoring, traffic control, building automation, healthcare applications, etc. In some such applications a powered sensor may be used in a harsh environment, and it is desirable for the sensor to be untethered after deployment for as long as possible. However, most sensors are powered by batteries, and limited battery capacity is a major limitation for deployment of untethered sensor nodes. Finite sensor node lifetime implies finite lifetime of the applications or additional cost and complexity to replace batteries. Energy harvesting is one alternative for increasing the longevity of sensor nodes. If an energy source is periodically available for harvesting, a sensor node may operate for a substantially longer time than if only battery-powered. However, WSNs require very small energy harvesting devices to keep the size of the sensor node and the cost of sensor node deployment to a minimum. Consequently, the amount energy harvested may be relatively small, and device energy use must be correspondingly constrained.

SUMMARY

A device and method for controlling radio power in a wireless sensor network are disclosed herein. In one embodiment, a wireless sensor device includes a wireless transceiver, a white list generator, and power control logic. The wireless transceiver is configured to transmit and receive via a wireless sensor network. The white list generator configured to identify wireless sensor nodes that communicate directly with the wireless sensor device via the wireless sensor network, to identify time slots assigned for communication between the wireless sensor device and each of the identified wireless sensor nodes, and to create and maintain a list of the identified wireless sensor nodes and corresponding time slots. The power control logic is configured to power the transceiver for reception of transmissions from each identified wireless sensor node based on the identified time slots corresponding to the identified wireless sensor node provided in the list.

In another embodiment, a method includes identifying, by a wireless sensor device, wireless sensor nodes that communicate directly with the wireless sensor device via a wireless sensor network. Time slots assigned for communication between the wireless sensor device and each of the identified wireless sensor nodes are identified by the wireless sensor device. A list of the identified wireless sensor nodes and corresponding time slots is created and maintained by the wireless sensor device. A transceiver for reception of transmissions from each identified wireless sensor node is powered by the wireless sensor device based on the identified time slots corresponding to the identified wireless sensor node provided in the list.

In a further embodiment, a wireless sensor network includes a plurality of sensor nodes configured to wirelessly communicate. Each of the sensor nodes is configured to suppress periodic receiver activation, and includes a white list generator and power control logic. The white list generator is configured to identify, during a network initialization interval, neighboring sensor nodes that communicate directly with the sensor node, to identify time slots assigned for communication between the sensor node and each of the identified neighboring sensor nodes, and to create and maintain a list of the identified neighboring sensor nodes and corresponding time slots. The power control logic is configured to power a transceiver for reception of transmissions from each identified neighboring sensor node based on the identified time slots corresponding to the identified neighboring sensor nodes provided in the list.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
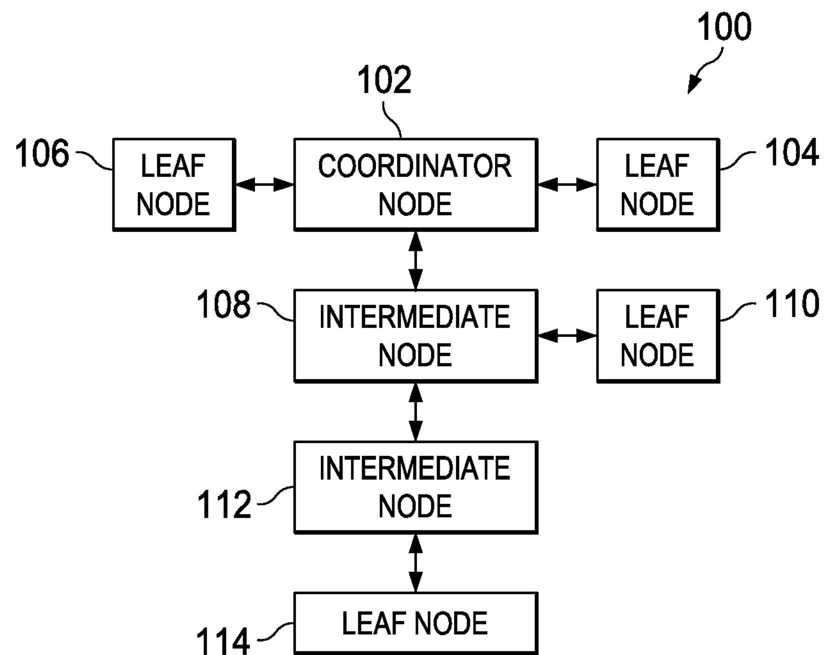
FIG. 1 shows a block diagram of a wireless network in accordance with various embodiments.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. The recitation "based on" is intended to mean "based at least in part on." Therefore, if X is based on Y, X may be based on Y and any number of additional factors.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Radio power consumption dominates power consumption in battery-operated wireless sensor network devices. Therefore, to ensure longevity of the wireless sensor network devices, radio use should be minimized while providing for sufficient communication between devices. Some conventional sensor network devices minimize radio power consumption by duty cycling radio listening rather than busy-wait radio listening. In duty cycle radio listening, the radio is periodically activated for a short time to receive packets, while in busy-wait radio listening the radio is continually powered. Use of duty cycle listening can greatly reduce radio power consumption.

In most sensor networks that employ duty cycle listening, the periodic listening dominates power consumption because packet transmissions are much less frequent than the listening period. (e.g., 1 packet transmitted per minute). Accordingly, additional techniques for increasing the life of low-power sensor network devices are desirable.

In embodiments of the present disclosure, during wireless sensor network initialization, wireless devices identify other devices in the network and the time slots/frames during which the devices communicate. Each device constructs and maintains a white list that specifies the time slots/frames during which the device's radio is powered to communicate with other devices. By power the radio only during the slots/frames specified in the white list, the wireless device can substantially reduce the power consumed by the radio while ensuring that the radio is powered at times when communication may occur.

FIG. 1 shows a block diagram of a wireless network 100 in accordance with various embodiments. The wireless network 100 includes a plurality of devices 102-114 that wirelessly communicate with one another. The devices 102-114 are also called nodes. While, as a matter of convenience, FIG. 1 shows only a few wireless nodes, in practice, the network 100 may include any number of wireless nodes. The devices 102-114 may be powered by sources, such as batteries, energy harvesting systems, etc., that provide limited energy. The network 100 may be a wireless sensor network and each of the devices 102-114 may be a wireless sensor device/node that measures one or more parameters of the environment and transmits the measurements via the network 100.

In the network 100, node 102 operates as a coordinator. The coordinator node 102 may serve as a base station for the network 100. Nodes 104 and 106 are leaf nodes that are located at a distance from the coordinator node 102 that allows the coordinator node 102 to directly communicate with each of the leaf nodes 104 and 106. Node 108 is an intermediate node. Intermediate node 108 is also located at a distance from the coordinator node 102 that allows the intermediate node 108 to communicate directly with the coordinator node 102.

Because the nodes 102-114 have limited wireless communication range, not all nodes in the network 100 can communicate directly with the coordinator node 102. In the network 100, the nodes 110, 112, and 114 are disposed too far from the coordinator to allow direct communication with the coordinator. The leaf node 110 and the intermediate node 112 communicate directly with the intermediate node 108, and communicate indirectly with the coordinator node 102 through the intermediate node 108. The leaf node 114 is located at a distance from the intermediate node 108 that prevents direct communication between the leaf node 114 and the intermediate node 108. The leaf node 114 communicates directly with the intermediate node 112, and communicates with the coordinator 102 indirectly through the intermediate nodes 112 and 108.

Figure 2:
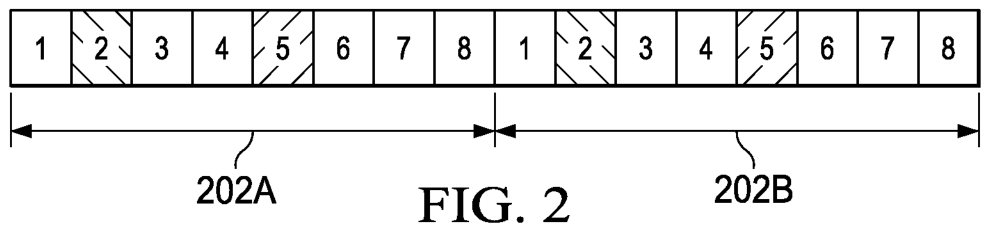
FIG. 2 shows a diagram of slot/frame timing used to communicate in a wireless sensor network in accordance with various embodiments.

The nodes 102-114 may communicate using a time division multiple access (TDMA) technique based on media access control protocols such as IEEE802.15.4e TSCH (Time Synchronized Channel Hopping) and wireless HART protocols. The nodes of the network 100 include logic for TDMA based duty cycling. FIG. 2 shows a diagram of slot/frame timing suitable for use in communication in the wireless network 100. In FIG. 2, the communication time is divided into superframes 202A and 202B. Each superframe (frame) includes a plurality of time slots. In FIG. 2, each superframe includes eight timeslots. In other embodiments, each superframe may include a different number of timeslots. In the network 100, the nodes 102-114 are assigned one or more of the timeslots on which communication may be initiated between two nodes. For example, in FIG. 2, two nodes are assigned timeslot 2 for communication, and a different pair of nodes is assigned timeslot 5 for communication.

The nodes 102-114 apply duty cycling to the TDMA timeslots/frames of FIG. 2. In TDMA duty cycling, each node 102-114 may power or otherwise enable its radio only during the timeslots/frames that have been assigned to the node for network communication. For example, nodes 102 and 104 may be assigned timeslot 2 for communication. Accordingly, nodes 102 and 104 may power associated radios for communication between the nodes only during timeslot 2 of a superframe. Additionally, nodes may be assigned specific superframes for communication. For example, nodes 102 and 104 may communicate in every other, every third, or every fourth superframe, etc. Thus, nodes 102 and 104 may power associated radios in timeslot 2 of superframe 202A and not power the radios in timeslot 2 of superframe 202B.

TDMA duty cycling protocols may define the type of each timeslot based on use. The beacon timeslot and control timeslot are two types of timeslots. The beacon contains time synchronization information of the TDMA network. The time synchronization information allows a new device to synchronize itself to the network without prior knowledge about the existing network. Further, even after initial synchronization, the beacon allows devices to compensate for clock drift between devices. The time of transmission and reception of the beacon packet is used by devices to adjust the timeslot timing and to maintain alignment with the TDMA timeslot boundaries of the network. Once a device has received a beacon packet and obtained synchronization information, the principal reasons for beacon reception are to compensate for clock drift between devices and to detect a change of network configuration such as timeslot changes. When clock drift can be tolerated, the device can skip some beacon receptions by suppressing unnecessary listening on the beacon timeslot.

A control timeslot allows new devices to exchange packets with the network for joining or associating with the network. The control timeslot also allows devices to exchange packets for maintaining and updating the topology of the network. Control timeslots are infrequently used once the network has been settled. The use of control timeslots becomes frequent only when new devices want to join an existing network which triggers a set of packet exchanges for association of a new device and topology updates. After the network has been settled, the devices can suppress some unnecessary listening on the control timeslot.

In conventional wireless networks, suppressing/skipping slots or slotframes can result in delay in connection setup for nodes attempting to connect/associate with the network. When slots are suppressed, it may take substantial time for nodes to transmit association request frames and eventually connect with the coordinator. Embodiments of the network 100 provide reduced connection setup time, relative to conventional networks that apply TDMA duty cycling to suppress slots/frames, while also providing the power benefits of slot/frame suppression.

The wireless network 100 is generally static. That is, during an initialization interval the nodes 102-114 join the network 100 and the communication paths between the nodes 102-114 are established. Thereafter, changes to the network 100 are infrequent. During the initialization interval, each node identifies other nodes with which it communicates directly and indirectly, and identifies the slot/frame timing assigned for communication with each other node. Based on the identified nodes and timing, each node creates a white list that defines the slot/frames during which a radio may be powered for communication, and conversely identifies the slots/frames during which the radio need not be powered. Each node applies its white list to control radio power after network initialization, and during initialization slot/frame suppression is not enforced, which reduces node connection time.

Figure 3:
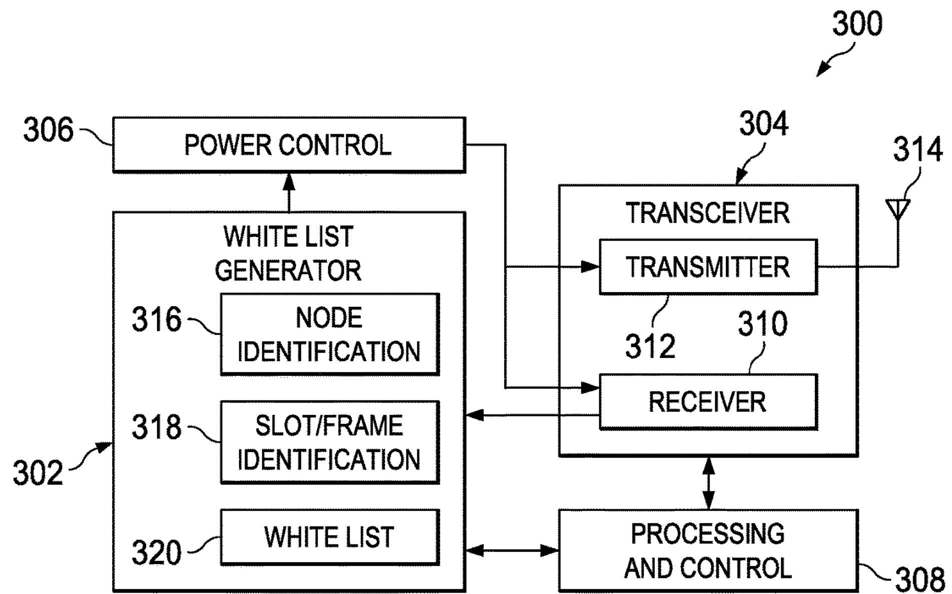
FIG. 3 shows a block diagram of a wireless device configured to access a wireless network in accordance with various embodiments.

FIG. 3 shows a block diagram of the wireless device 102 suitable for use in the wireless network 100. The structure and functionality described herein with regard to the wireless device 102 is equally applicable to the wireless nodes 104-114, and any other wireless node of the network 100. The device 102 includes a white list generator 302, a transceiver 304, power control logic 306, processing and control logic 308, and an antenna 314. The wireless device 102 may also include various components that have been omitted from FIG. 3 as a matter of clarity. For example, the wireless device may include transducers or sensors for measuring parameters of the environment in which the wireless device 102 operates, digitization circuitry, analog signal processing circuitry, etc.

The antenna 314 converts signals between conducted and airwave form. The antenna 314 is coupled to the transceiver 304. The transceiver 304 includes a receiver 310 and a transmitter 312. The receiver 310 provides downconversion, demodulation, decoding, etc. for signals detected by the antenna (i.e., signals received via the wireless channel), and the transmitter 312 provides encoding, modulation, amplification, etc. of signals to be transmitted via the antenna 314.

The power control logic 306 is coupled to the transceiver 304. The power control logic 306 generates signals that control whether the receiver 310 and/or the transmitter 312 are enabled. For example, the signals may control whether the receiver 310 and/or the transmitter 312 are powered in a given slot/frame. In some embodiments, the power control logic 306 may control the switching of power to the receiver 310 and/or the transmitter 312. In other embodiments, the power control logic 306 may control the provision and/or frequency of clock signals provided to the receiver 310 and/or the transmitter 312.

The white list generator 302 builds and maintains a list that identifies nodes of the network 100 that communicate with the wireless device 102 and identifies the slots/frames assigned for the communication. Based on the list, the white list generator 302 provides power control information to the power control logic 306. The white list generator 302 includes node identification logic 316 and slot/frame identification logic 318 that generate the white list 320. The node identification logic 316 identifies the nodes of the network 100 that communicate directly with the wireless device 102, and identifies the nodes of the network 100 that communicate indirectly with the wireless device 102 through one or more intermediate nodes. The slot/frame identification logic 318 identifies the slots/frames assigned for communication between the wireless device 102 and other nodes of the wireless network 100. The white list 320 contains the node and slot/frame information identified by the node identification logic 316 and the slot/frame identification logic 318. The slot/frame information stored in the white list 320 is provided to the power control logic 306 to control enabling of the receiver 310 and/or the transmitter 312.

The processing and control logic 308 provides control and data processing for the wireless device 102. For example, the processing and control logic 308 may provide TDMA timing for use in transmitting and receiving data via the wireless channel, may provide communication protocol processing, transducer data processing, etc. In some embodiments, the processing and control logic 308 may include a processor, memory for instruction and data storage, clock and timing circuitry, and various other components. In some embodiments, the white list generator 302 may be integrated with the processing and control logic 308. For example, a processor of the processing and control logic may execute instructions that cause the processor to perform the functionality of the white list generator 302.

A processor suitable for use in the processing and control logic 308 may be a general-purpose microprocessor, a digital signal processor, a microcontroller, or other device capable of executing instructions retrieved from a computer-readable storage medium. Processor architectures generally include execution units (e.g., fixed point, floating point, integer, etc.), storage (e.g., registers, memory, etc.), instruction decoding, instruction and data fetching logic, peripherals (e.g., interrupt controllers, timers, direct memory access controllers, etc.), input/output systems (e.g., serial ports, parallel ports, etc.) and various other components and sub-systems.

Memory suitable for use in the processing and control logic 308 is a non-transitory computer-readable storage medium suitable for storing instructions that are retrieved and executed by a processor of the wireless node 102 to perform the functions disclosed herein. The memory may include volatile storage (such as static or dynamic random access memory) and/or non-volatile storage (e.g., FLASH storage, read-only-memory, etc.).

The power control functionality provided by the white list generator 302 and power control logic 306 may be based in part on the functionality provided by or the role of the wireless device 102 in the network 100, and/or the location and connectivity of the device 102 in the network 100. Operation of the wireless device 102 in various scenarios is described below.

In one operational scenario, a direct connection scenario, a coordinator node communicates directly with a leaf node. If the wireless device 102 is a coordinator in the network 100 and is powered by a source that provides unlimited power (e.g., AC power mains), then the power control logic 306 may allow the receiver 310 and the transmitter 312 to be powered continually because no power savings are needed to extend the life of the wireless device 102. If the wireless device 102 is operating as a coordinator of the network 100 and the power source (e.g., a battery) of the wireless device 102 provides limited power, then the white list generator 302 creates the white list 320 during a predetermined network initialization interval (e.g., 1 day). When the network 100 is stable (e.g., the initialization interval expired or no new nodes are identified for a predetermined time), the white list 320 is applied to reduce power consumed by the receiver 310 and/or transmitter 312 by powering the receiver 310 and/or transmitter 312 only during slots/frames assigned for communication between the wireless device 102 and nodes identified during the initialization interval. That is, the white list 320 is applied to control slot/frame skipping/suppression that disables receiver 310 and/or transmitter 312 power during slots/frames not assigned for communication. In some embodiments, the white list may be applied to enable slot/frame skipping/suppression at any time after a leaf node has connected to the coordinator wireless device 102. During network initialization, the wireless device 102 may reduce network initialization by not applying slot/frame skipping/suppression.

If the wireless device 102 is operating as a leaf node in the wireless network 100, then the white list generator 302 will create the white list 320 when the wireless device 102 joins the network (e.g., establishes a connection with a coordinator node). As a leaf node, the wireless device 102, may apply the white list 320 to direct slot/frame skipping/suppression at any time after joining the network 100. When operating as a leaf node, the wireless device 102 may assume that the coordinator node is always on.

In a second operational scenario, an indirect connection scenario, leaf nodes are indirectly connected to a coordinator through an intermediate node. In the indirect connection scenario, the wireless device 102, if powered by a limited energy source, operates as a coordinator much as described for the direct connection scenario, and also receives from intermediate nodes identification of the leaf nodes connected to the intermediate nodes. In the indirect connection scenario, the wireless device 102 operating as a coordinator node may not apply the white list 3200 for slot/frame skipping/suppression until intermediate nodes have provided leaf node identification to the wireless device 102. If the wireless device 102 is operating as an intermediate node, then the wireless device 102 operates much as the coordinator node is described as operating in the direct connection scenario. If the wireless device 102 is operating as a leaf node, then the wireless device 102 operates much the leaf node described with regard to the direct connection scenario.

In a third operational scenario, a multi-hop connection scenario, leaf nodes are indirectly connected to a coordinator through multiple intermediate nodes. In the multi-hop connection scenario, the wireless device 102, if powered by a limited energy source, operates as a coordinator much as described for the indirect connection scenario. In the multi-hop connection scenario, the wireless device 102 operating as a coordinator node may not apply the white list 320 for slot/frame skipping/suppression until all intermediate nodes have provided leaf node identification to the wireless device 102. If the wireless device 102 is operating as an intermediate node disposed between the coordinator and another intermediate node, then the wireless device 102 operates much as the coordinator node is described with regard to the indirect connection scenario. If the wireless device 102 is operating as an intermediate node only with respect to leaf nodes, then the wireless device 102 operates much as the intermediate node is described with regard to the indirect connection scenario. If the wireless device 102 is operating as a leaf node, then the wireless device 102 operates much the leaf node described with regard to the direct connection scenario.

Figure 4:
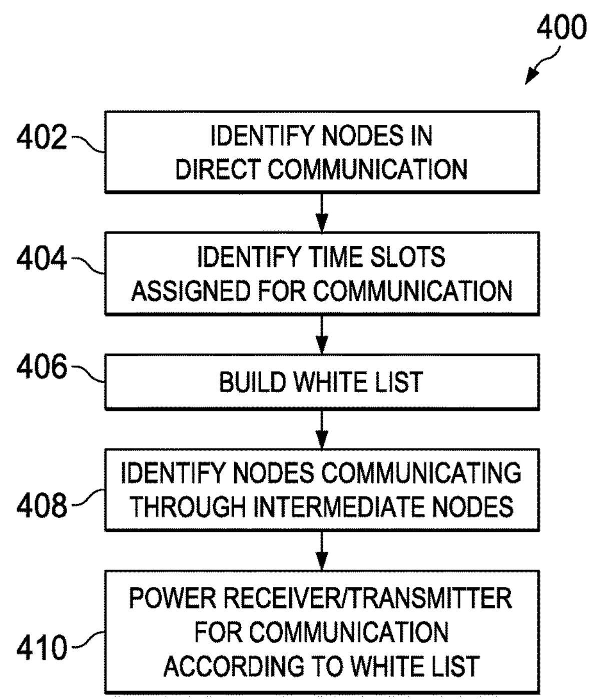
FIG. 4 shows flow diagram for a method for power optimization in a wireless network in accordance with various embodiments.

FIG. 4 shows a flow diagram for a method 400 for power optimization in a wireless network in accordance with various embodiments. Though depicted sequentially as a matter of convenience, at least some of the actions shown can be performed in a different order and/or performed in parallel. Additionally, some embodiments may perform only some of the actions shown. At least some of the operations of the method 400 may be performed by a processor executing instructions retrieved from a non-transitory computer readable storage medium.

In block 402, the network 100 is initializing, and the nodes are joining the network 100 by establishing communication with other nodes. Each node identifies the nodes with which the node directly communication (i.e., neighboring nodes).

In block 404, each node has established communication with neighboring nodes, and time slots/frames are assigned for communication between the nodes. Any number of time slots per frame may be assigned for use by the nodes, and fewer than all frames (e.g., alternate frames) may be assigned for communication between nodes.

In block 406, each node builds a white list that contains information identifying the time slots/frames on which communication between nodes may take place and identifying the node associated with each time slot/frame combination.

In block 408, each coordinator node receives from each intermediate node directly connected to the coordinator node, information that identifies the leaf nodes and additional intermediate nodes directly connected to the intermediate node. That is, the coordinator node receives information regarding the identity of leaf nodes and intermediate nodes indirectly connected to the coordinator node. Similarly, each intermediate node that is disposed between a coordinator node and an upstream intermediate node receives information from the upstream intermediate node that identifies the leaf nodes and intermediate nodes directly connected to the upstream intermediate node, and may forward the information to the coordinator node. Each node may add the information regarding nodes to which the node is indirectly connected to the white list 320 of the node.

In block 410, each node of the network 100 applies the white list 320 to control at what times the receiver 310 and/or transmitter 312 of the node is powered for communication with other nodes. The coordinator and/or intermediate nodes may not apply a white list during network initialization.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A white list generator, comprising:

a processor that optimizes power consumption by performing the functions of:

node identification to identify wireless sensor nodes that communicate via a wireless sensor network;

slot/frame identification to identify time slots assigned for communication with each of the identified wireless sensor nodes; and white list function to create a list of the identified wireless sensor nodes and corresponding time slots during a network initialization interval and maintain the list of the identified wireless sensor nodes and corresponding time slots.

2. The white list generator of claim 1, wherein the processor is configured to identify the wireless sensor nodes over a predetermined time interval.

3. The white list generator of claim 1, wherein the processor is configured to:
receive identification of additional wireless sensor nodes that indirectly communicate through an intermediate wireless sensor node; and
add to the list the additional wireless sensor nodes and time slots assigned for communication between the intermediate wireless sensor node and the additional wireless sensor nodes.

4. The white list generator of claim 3, wherein the identification of additional wireless sensor nodes comprises identification of the additional wireless sensor nodes that communicate with the wireless sensor nodes through a plurality of successive intermediate wireless sensor nodes.

5. The white list generator of claim 1, wherein the processor is further configured to:
identify frames containing the time slots assigned for communication with each of the identified wireless sensor nodes;
include identification of the frames in the list.

6. The white list generator of claim 5, wherein the processor provides power control information to power the transceiver for reception of transmissions from each identified wireless sensor node based on the identified frames corresponding to the identified wireless sensor node provided in the list.

7. A method performed by white list generator, comprising:
identifying wireless sensor nodes which communicate via a wireless sensor network;
identifying time slots assigned for communication with each of the identified wireless sensor nodes;
creating a list of the identified wireless sensor nodes and corresponding time slots during a network initialization interval and maintaining the list of the identified wireless sensor nodes and corresponding time slots; and
providing power control information to optimize power consumption.

8. The method of claim 7, wherein the identifying of wireless sensor nodes is performed over a predetermined interval at initialization of the wireless sensor network.

9. The method of claim 7, further comprising:
receiving from a transceiver identification of additional wireless sensor nodes which indirectly communicates through an intermediate wireless sensor node; and
adding to the list the additional wireless sensor nodes and time slots assigned for communication between the intermediate wireless sensor node and the additional wireless sensor nodes.

10. The method of claim 9, wherein the identification of additional wireless sensor nodes comprises identification of wireless sensor nodes that communicate through a plurality of successive intermediate wireless sensor nodes.

11. The method of claim 9, further comprising:
identifying frames containing the time slots assigned for communication with each of the identified wireless sensor nodes;
including identification of the frames in the list; and
powering, via power control information, the transceiver for reception of transmissions from each identified wireless sensor node based on the identified frames corresponding to the identified wireless sensor node provided in the list.

12. The method of claim 9, further comprising powering, via power control information, the transceiver for reception of transmissions during all time slots prior to identification of a wireless sensor node in direct communication with the transceiver.

* * * * *